Figure 1:
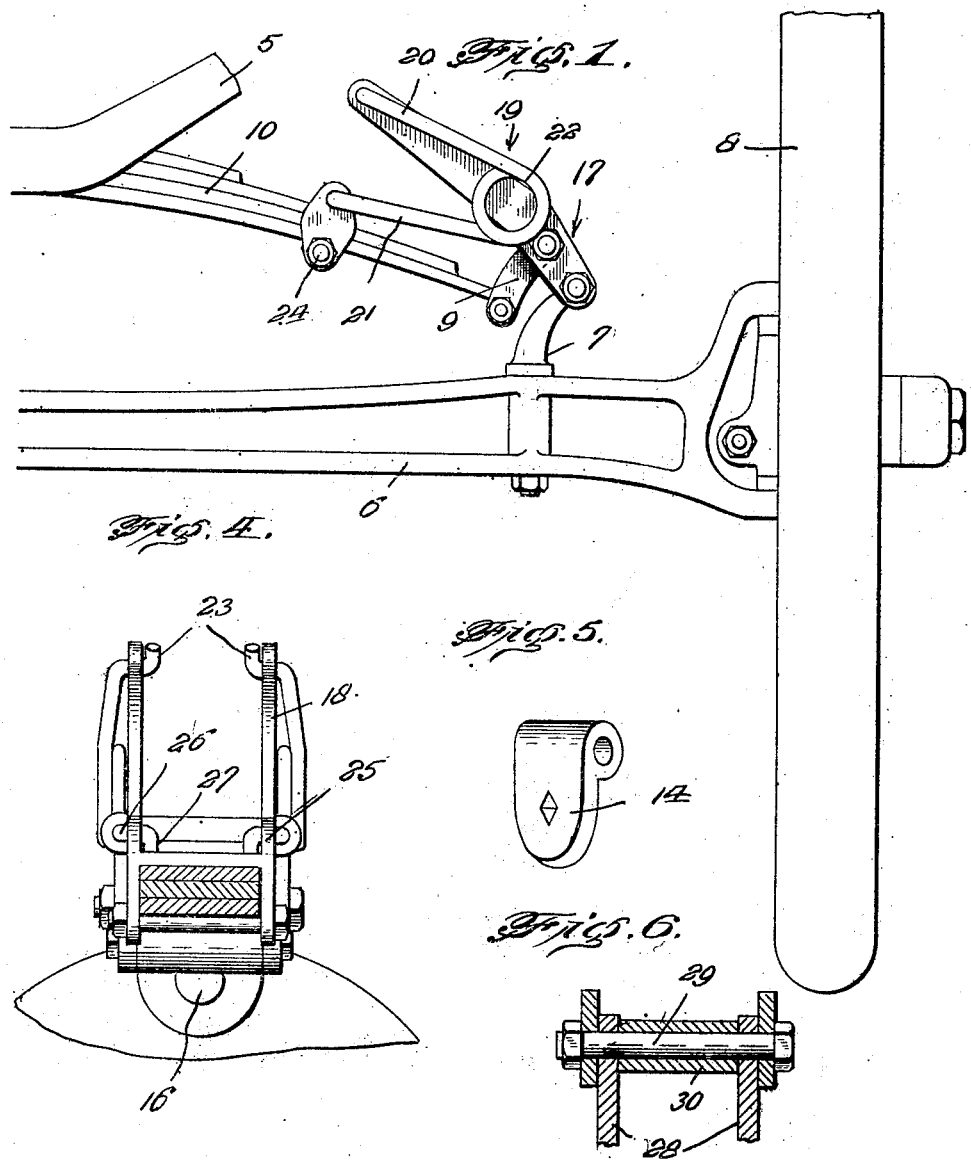

April 28, 1925.

B. F. BARLOW

SHOCK ABSORBER

Filed Dec. 14, 1923

1,535,086.

2 Sheets-Sheet 1

Inventor
B. F. Barlow.

April 28, 1925.

B. F. BARLOW

SHOCK ABSORBER

Filed Dec. 14, 1923

1,535,086

2 Sheets-Sheet 2

Witness.
F. C. Gibson.

Inventor
B. F. Barlow.
By Clarence A. O'Brien
Attorney

Patented Apr. 28, 1925.

1,535,086

UNITED STATES PATENT OFFICE.

BENJAMIN FRANKLIN BARLOW, OF TRAVIS, TEXAS.

SHOCK ABSORBER.

Application filed December 14, 1923. Serial No. 680,692.

*To all whom it may concern:*

Be it known that I, BENJAMIN FRANKLIN BARLOW, a citizen of the United States, residing at Travis, in the county of Falls and State of Texas, have invented certain new and useful Improvements in Shock Absorbers, of which the following is a specification.

This invention relates to an improvement in shock absorbers and has for its primary object the provision of a means which shall be readily applicable to an existing spring suspension of a motor vehicle, and adapted to improve the action of such spring suspension so as to increase the ease of riding while decreasing the tendency to rebound, such as exists in the original spring system.

A further object of the invention resides in the provision of such a shock absorber wherein the same is of such a construction as to resiliently suspend the springs of the vehicle in such a manner as to relieve the springs of a portion of the road shock.

Figure 2:
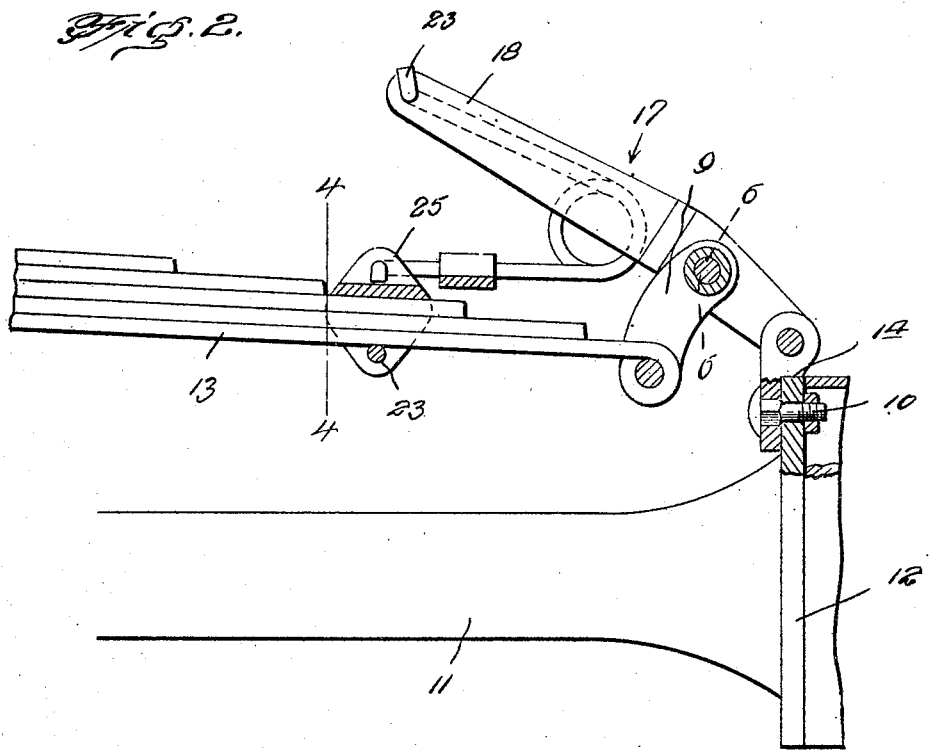
Figure 3:
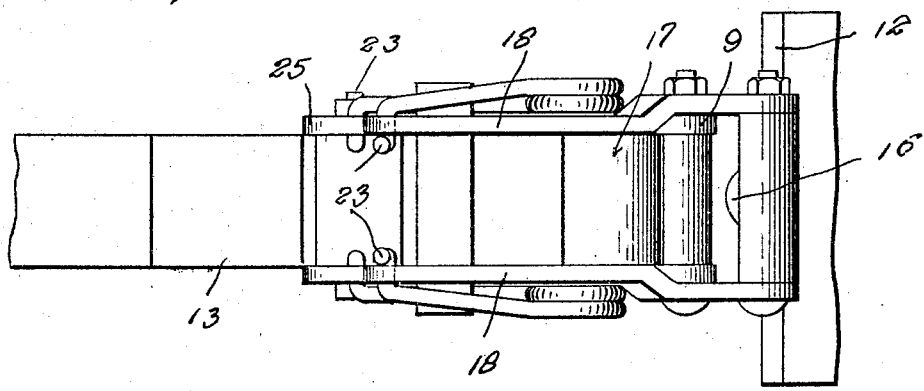

With the above and other objects in view which will become apparent as the description proceeds, the invention resides in the construction, combination and arrangement of parts hereinafter more fully described, claimed and illustrated in the accompanying drawings in which like reference characters indicate corresponding parts throughout the different views, and wherein:

Figure 1 is an enlarged fragmentary front elevational view of a motor vehicle equipped with my improved shock absorber, Figure 2 is a similar view partly in cross section of the rear of the vehicle, the shock absorbing elements between the ends of the springs and the axles at the front and rear of the vehicle being substantially the same, Figure 3 is a top plan view of Figure 2, Figure 4 is a detail vertical cross section taken substantially upon the line 4—4 of Figure 2 and looking in the direction toward the right of the figure, Figure 5 is a perspective of a bracket or perch element that is rigidly attached to the brake housing and to the rear of the vehicle and to which the shock absorbing means for the rear of the vehicle is to be attached, and Figure 6 is a detail fragmentary cross section taken substantially upon the broken line 6—6 of Figure 2.

The devices embodying this invention are shown in drawings as applied to a motor vehicle in which the spring suspension consists simply of a comparatively long semi-elliptic leaf spring interposed between the frame 5 and each of the axles, such spring extending over and in the same vertical plane as the axle which it connects to the frame. It will be understood however, that the invention is not limited in its application to this type of spring suspension as will appear upon further description.

Referring first to Figure 1 wherein there is disclosed one of the shock absorbing devices employed for supporting resiliently the front vehicle spring above the axle, it will be noted that this front axle 6 has bolted to it a bracket or perch 7, shown with its upper end bent laterally outward from the vehicle body extending obliquely upward toward the road wheel 8, at the same side of the vehicle. In its orignal arrangement this bracket 7 is mounted to extend obliquely inward toward the body of the vehicle so that it may support the upper end of a link 9, whose lower end pivotally engages the end of the transverse spring 10.

With particular reference to the remaining figures wherein there is disclosed the spring suspension device for the rear vehicle spring and wherein the construction thereof is substantially similar to the front spring suspension device with the exception of practically one or two parts, 11 designates the rear axle of the vehicle, 12 the brake drum thereof and 13 the usual transverse spring. In this instance, a bracket or perch 14 of the design further shown in Figure 5 is rigidly secured through the medium of bolt and nut fastening means 16 to said brake housing 12 and this at the upper side thereof. Pivotally secured at one end to this bracket or perch 14 is a fitting designated generally 17 and is identical in construction to the fitting 17′ for the front spring suspension device.

From now on the description will refer directly to the spring suspension device at the front and rear of the vehicle, and the same reference character will be given to these devices at opposite ends of the vehicle.

Said fittings comprise a pair of spaced parallel extending links 18 between which are pivotally secured and this adjacent their pivotal ends, the usual spring connected links before referred to and designated by the reference character 9.

Upon the outer side of each of said links 18 comprising the fitting 17 is a U-shaped spring 19 each of which comprises an upper and lower spring arm 20 and 21 interconnected by a spring loop 22. The free ends of the upper arms 20 are bent laterally inwardly and pass through openings in the links 18 of the fitting and are then again bent upwardly as at 23 in Figures 2, 3 and 4, so as to prevent the disengagement of said arms from the openings in the links.

Upon each of the springs 10 and 13, is an inverted U-shaped clamp 23 that is maintained upon the respective spring through the medium of a bolt and nut connection designated generally 24. These clamps are formed upon their opposite edges and at their top sides with lugs 25 that are formed with openings for the reception of the inwardly bent portions 26 of the lowermost arms 21 of said springs 19. After these inwardly bent ends of the arms 21 of said spring are engaged through the openings in the lugs 25 the same are bent downwardly as at 27 for preventing disengagement therefrom.

The links designated generally 9 between the springs 10 and 13 and the respective fittings 17 comprise as shown in Figure 6, a pair of slightly curved link plates 28 that are formed adjacent their upper ends with alined openings for registration with openings in the links 18 of the fittings 17 whereby a bolt 29 may be extended therethrough, it being noted that said link plates 28 are maintained separated by a bushing 30 interposed therebetween and through which said bolt 29 extends.

It will thus be seen that I have provided a highly novel and efficient form of shock absorbing means and one that may be easily and expeditiously applied to motor vehicles and particularly those of the Ford type.

Minor changes may be made in the invention without departing from the spirit and scope of the appended claims.

Having thus described my invention, what I claim as new and desire to secure by Letters Patent is:—

1. An automobile shock absorber comprising an attaching bracket adapted to be interposed between one end of a leaf spring and an axle, said bracket comprising spaced parallel arms, a pair of transversely spaced links connected to said arms adjacent the outer end of the bracket, the lower ends of said links being adapted to be connected with one end of the spring, an auxiliary spring comprising a central coil, and a pair of inwardly extending and diverging arms, the free ends of said arms being connected in one instance to one of the bracket arms and in the other instance to a clamp adapted to be connected with the main spring.

2. A shock absorber for automobiles comprising an attaching bracket adapted to be interposed between one end of a leaf spring and the automobile axle, said bracket comprising a pair of connected arms disposed in spaced parallelism, a pair of links pivotally connected to the arms of said bracket at a point between the center and the outer end thereof, a spacing sleeve interposed between the links, a bolt passing through the links and spacing sleeve and the arms of said bracket, the lower end of said links being adapted to be connected to an adjacent end of the leaf spring, a clamp adapted to be connected to said leaf spring at a point spaced inwardly from the links, a pair of auxiliary springs, each of said springs comprising a central coil, and a pair of inwardly diverging arms, the lower arms being connected with said clamp and the upper arms being connected with the inner end of the arms of said bracket.

In testimony whereof I affix my signature.

BENJAMIN FRANKLIN BARLOW.